United States Patent
Staudigel et al.

(10) Patent No.: US 6,298,193 B1
(45) Date of Patent: Oct. 2, 2001

(54) DEVICE AND METHOD FOR APPLYING LIGHT CONDUCTIVE FIBERS

(75) Inventors: Lothar Staudigel, Neu-Ulm; Michael Trutzel, Blaustein, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/438,362

(22) Filed: Nov. 12, 1999

(30) Foreign Application Priority Data

Nov. 13, 1998 (DE) ................................................ 198 52 345

(51) Int. Cl.[7] .................................................... G02B 6/00
(52) U.S. Cl. ............................ 385/147; 383/136; 383/49
(58) Field of Search ................................ 385/65, 53, 83, 385/76, 147, 136, 137, 80, 49, 14

(56) References Cited

U.S. PATENT DOCUMENTS

| | | | |
|---|---|---|---|
| 4,237,474 | 12/1980 | Ladany | 385/81 |
| 4,950,046 | * 8/1990 | Hughes et al. | 385/65 |
| 4,997,253 | 3/1991 | Enochs | 385/49 X |
| 5,046,800 | * 9/1991 | Blyler, Jr. et al. | 385/131 |
| 5,155,782 | 10/1992 | Kamir et al. | 385/77 |
| 5,194,105 | * 3/1993 | Nguyen | 385/14 X |
| 5,259,051 | * 11/1993 | Burack et al. | 385/76 |
| 5,574,811 | * 11/1996 | Bricheno et al. | 385/52 |

FOREIGN PATENT DOCUMENTS

| | | | |
|---|---|---|---|
| 3815459A1 | 11/1989 | (DE) | 385/147 X |
| 69311074T2 | 9/1997 | (DE) | 385/147 X |
| 0665455A1 | 8/1995 | (EP) | 385/147 X |

* cited by examiner

Primary Examiner—Brian Healy
(74) Attorney, Agent, or Firm—Venable; Norman N. Kunitz

(57) ABSTRACT

A device for applying light conductive fibers onto substrates and having a mounting yoke, a holding device and a stamping device. The holding device is configured as a U-shaped base body with an upward arching outside area having guide grooves and holders for installing the fibers in the device. The stamping device consists of a stamp, a stamp neck and a stamp head, which are inserted and linearly guided in the U-shaped die sink in the holding device. The device ensures a precise positioning of fibers and in particular of functional units in fiber segments. Fiber breaks can be nearly ruled out with the application method. The separating foils ensure that the device can be removed after the adhesive has hardened, so that no force is exerted onto the fiber through excess adhesive that sticks.

19 Claims, 2 Drawing Sheets

DEVICE AND METHOD FOR APPLYING LIGHT CONDUCTIVE FIBERS

CROSS-REFERENCE TO RELATED APPLICATION

This application claims the priority of German Patent Application Serial No. 198 52 345.9, filed in Germany on Nov. 13, 1998, the subject matter of which is incorporated herein by reference.

BACKGROUND OF THE INVENTION

The present invention relates to a device for applying light conductive fibers onto substrates, which device has a mounting yoke, a holding device and a stamping device, as well as to a method for applying light conductive fibers, as is described in detail below.

Light conductive fibers, e.g. containing locally inscribed structures such as Bragg grids, can be used as optical sensors for measuring pressure, temperature or expansion. Among other things, they are distinguished by their EMI safety and chemical robustness, can be produced cheaply and can be adapted, based on the respective requirements, to the measuring variables to be detected. Fiber sensors of this type can be used for monitoring tasks in many areas of industrial technology. For this, the Bragg grid fiber sensors, for example, are either embedded in the material of the region to be tested or applied to the material surface.

So far, electro-optical modules and production methods are known from the U.S. references U.S. Pat. Nos. 4,997,253 and 4,237,474, where fibers are applied to a planar substrate surface. The U.S. Pat. No. 4,997,253 teaches installing the fiber on a T-shaped mounting aid to position it relative to an electronic component, e.g. a diode. Subsequently, the fiber is applied to the substrate base and is adjusted by means of a micro-manipulator acting upon the mounting aid and a soldering operation. According to the U.S. reference U.S. Pat. No. 4,237,474, this is done with the aid of several cube-shaped, glued-together mounting aids.

The mechanical dimensions present problems during the handling and processing, particularly when securing the sensors on a surface structure, because a sensor of this type can have a total length of several meters while its diameter is only approximately 100–200 $\mu$m. This results in considerable handling problems for the user, which normally require extensive adjustment procedures.

It is the object of the invention to specify a device and an advantageous method for applying light conductive fibers to substrate surfaces.

SUMMARY OF THE INVENTION

The invention involves a device for applying light conductive fibers onto substrates, which device comprises a mounting yoke, a holding device and a stamping device.

The holding device consists of a U-shaped base body having an outside region that arches upward and is provided with guide grooves as well as holders for installing the fibers in the device.

Guide grooves that completely accommodate the fibers extend in the region of the joint contact surface for the underside of the holding device and the substrate. The guide grooves installed in the outside region of the holding device are preferably V-shaped, wherein magnetic holders are used there to secure the fibers.

The stamping device, which comprises a stamp, a stamp neck and a stamp head, is located in the U-shaped die sink in the holding device and is arranged such that it can move in linear direction, relative to the holding device. A guide pin that is attached to the stamp head and extends inside a bore through the holding device serves as linear guide. This guide pin prevents a twisting of the stamping device, relative to the holding device. A spring that is fitted over the stamp neck is positioned between the base body and the stamp head, such that for the basic adjustment, the stamping device assumes a position that is slightly pulled back during the application, relative to the substrate surface. This position is determined by a detent on the stamp neck.

The stamp is provided with a rubber plate on the underside. This plate prevents damage to the plastic casing of the fiber to be applied. At least one separating foil is fitted over the underside of the rubber plate to prevent the fiber from adhering as a result of excess adhesive. Moreover, the stamp underside has either a level design or the center region contains an indentation, preferably in the sub-millimeter range, between the stamp and the rubber plate. As a result, undesirable stresses in the material are prevented locally during the application.

The method for applying light conductive fibers to a substrate involves the following separate steps:

The holding device with the stamping device is fitted onto the mounting yoke, such that the stamp underside points upward.

The cleaned fiber is inserted into the device, is aligned and is secured.

Adhesive is applied to the fiber and the substrate over the predetermined gluing length.

The holding device, comprising the stamping device and the secured fiber, is removed from the mounting yoke.

The fiber is applied to the substrate surface by exerting pressure on the stamp head and remains in this position until the adhesive has hardened.

If necessary, an additional separating foil is loosely fitted over the stamp head between the fiber and the separating foil prior to exerting the pressure.

A particular advantage of the invention is that it ensures a precise positioning of fibers, particularly of functional units in fiber segments. Fiber breaks can be nearly ruled out as a result of the application method. Another advantage is the stress-free application in the form of fiber segments with functional units because the indentations on the stamp underside pointedly reduce the contact pressure in those regions.

The separating foils ensure that the device can be removed, following the hardening of the adhesive, so that no forces are exerted on the fiber as a result of excess adhesive that sticks.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF THE PREFERRED EMBODIMENTS

Figure 1:
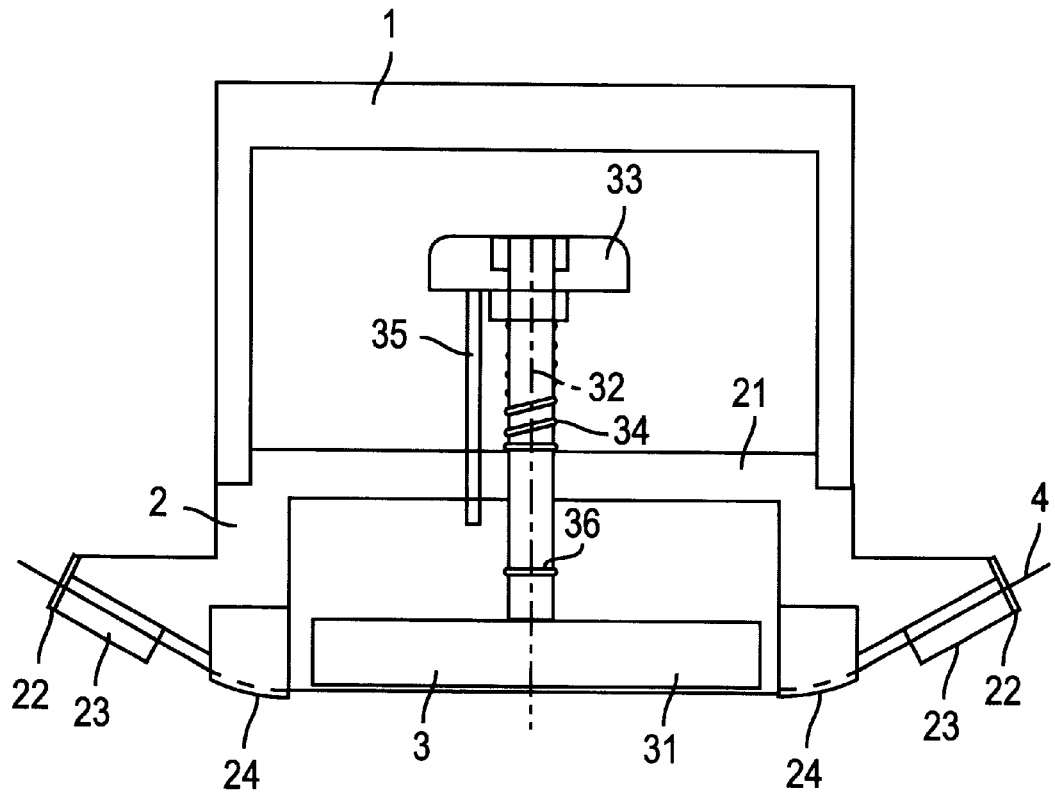
FIG. 1 shows the device with mounting yoke, holding device and stamping device.

FIG. 1 shows an example of the device for applying light conductive fibers, which device comprises the mounting yoke 1, the holding device 2 and the stamping device 3.

The holding device 2 consists of a U-shaped base body 21 with an outside region, flange or lateral extension that arches or is upward inclined and contains guide grooves 22 and holders 23 for installing the fiber 4 in the device. The outside region that arches upward guides the fiber 4 continuously and without sharp bends over the underside of the stamping device 3. The joint support surface for the holding device 2 and a substrate is located in the region of the grooves 24 on the underside.

As indicated in the Figure, the support surface can be produced as an insert made of different materials, e.g., Teflon, which materials are adapted to the requirements of the substrate. The guide grooves 24 completely accommodate the fibers. The required depth for the guide grooves 24 is based on the fiber diameter and the specification that during the application the fiber 4 is not subjected to stresses caused by the substrate (not shown) underneath. The preferred V-shaped design of guide grooves 22 in the outside region of the holding device results in a precise adjustment of the fiber 4. In cases where the holding device 2 is made of metal, magnetic holders 23 can be used immediately following the guide grooves 22 to secure the fibers 4, which holders permit a quick assembly.

The stamping device 3 comprises a stamp 31, which is fitted into the U-shaped base body of the holding device 2. The stalk-shaped neck 32 of the stamp is guided through the holding device 2 inside a bore or a sliding bearing in an end or cross member of the basic body 21 of the holding device. For the manual operation, a stamp head 33 is attached to the upper end of the stamp neck 32, which is used to exert pressure onto the fiber 4 to be applied. An electromechanical or pneumatic pressing aid can also be used in place of a manual activation. In order to ensure a linear guidance of the stamping device 3, a guide pin 35 is attached to the stamp head 33 and extends inside a bore through the end or cross member of the holding device 2. This guide pin 35 prevents a twisting of the stamping device 3, relative to the holding device 2.

A spring 34 that is fitted over the stamp neck 32 is positioned between base body and stamp head 33. For the basic adjustment, this spring holds the stamping device 3 in an upper position that is determined by a detent 36 on the stamp neck 32. The upper position is preset based on the assumption that during the application the fiber 4 with adhesive does not yet touch the substrate during the adjustment and positioning, and that the gluing occurs only by means of the force exerted onto the stamp head 33.

Figure 4:
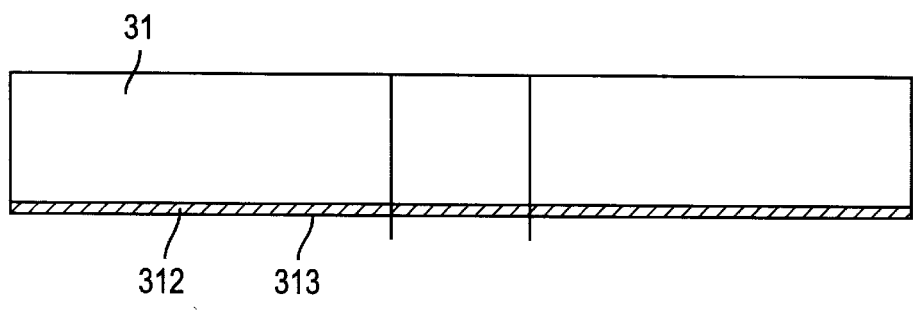
FIG. 4 shows a side view of the stamp.

According to FIG. 4, the stamp 31 is provided on the underside with a rubber plate 312 for an even pressure distribution and to prevent pressure damages to the plastic casing when applying the fiber 4 to a substrate. At least one separating foil 313 is pulled over the underside of rubber plate 312, which prevents the fiber 4 from sticking as a result of excess adhesive.

Figure 2:
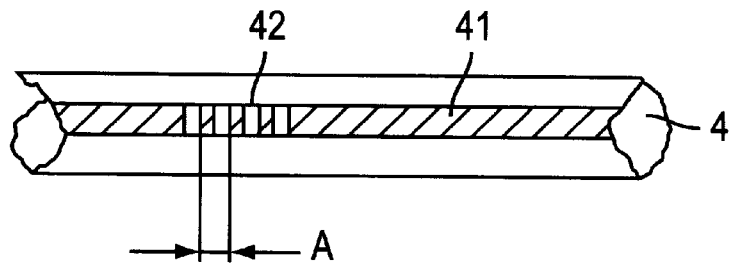
FIG. 2 shows the fiber with local structure that is designed as a Bragg grid.
Figure 3:
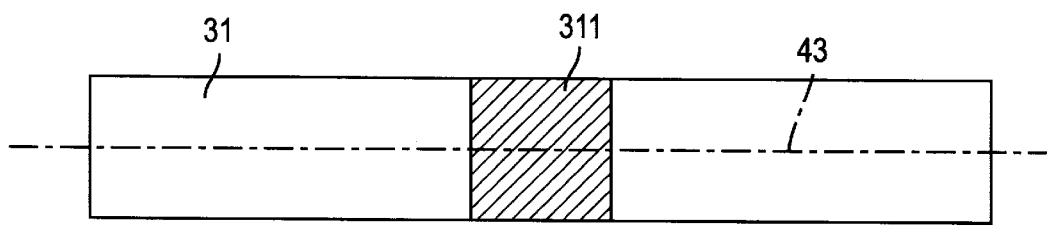
FIG. 3 shows the underside of the stamp.

The underside of stamp 31 is designed to be level or an indentation is provided between stamp and rubber plate in the central region 311, as can be seen in FIG. 3, preferably in the sub-millimeter range. As a result, locally undesirable stresses in the material are prevented during the application. In accordance with FIG. 2, a stress-free gluing is desired, particularly for structures that are inserted locally in the fiber core 41 of fiber 4, e.g. the Bragg grid 42. In that case, only a very slight pressure is exerted during the application onto the local structure, which is positioned exactly in the indentation. The intensity of the pressure is based on the indentation depth in the central region 311.

The method for applying light conductive fibers onto a substrate involves several individual steps. In a first step, the holding device 2 with stamping device 3 is fitted exactly onto the mounting yoke 1, in a position where the stamp underside points upward. The mounting yoke 1 in this case is mounted fixedly, e.g. on a laboratory table. The cleaned fiber 4 to be applied is inserted into the device along the axis 43 (FIG. 3). The fiber is aligned via the V-shaped guide grooves 22 and the guide grooves 24. With a metal design for the holders, the fiber is secured with magnetic holders 23. The stamp 31 by then has already been provided with a separating foil 313 on the underside. If necessary, an additional separating foil is loosely fitted over the stamp head between fiber 4 and separating foil 313 prior to exerting the pressure. In another process step, the fiber 4 and the substrate are provided with adhesive over the predetermined gluing length. The required amount of adhesive is essentially determined by the fiber cross section. Excess adhesive is partially pulled off with the separating foil 313 after the application. The holding device 2 with the stamping device 3 and the secured fiber 4 is removed from the mounting yoke 1. The fiber is applied to the substrate surface under pressure from the stamp head 33 and remains in this position until the adhesive has hardened, if necessary supported by an additional detent, e.g. a clamping screw. The separating foils ensure that the device can be removed following the hardening of the adhesive, so that no force is exerted on the fiber as a result of excess adhesive that sticks.

The device permits an exact positioning of fibers and, in particular, of functional units in fiber segments. Fiber breaks can be nearly ruled out with this application method. A stress-free application in fiber segments with functional units 42 according to FIG. 2 is achieved through the indentation on the stamp underside, which purposefully reduces the contact pressure in those regions.

It will be understood that the above description of the present invention is susceptible to various modifications, changes and adaptations, and the same are intended to be comprehended within the meaning and range of equivalents of the appended claims.

What is claimed is:

1. A device for applying light conductive fibers onto substrates, comprising a mounting yoke, a holding device and a stamping device; and wherein the stamping device consists of a stamp, a stamp neck and a stamp head, and the stamp is provided with a rubber plate to prevent the fiber from adhering.

2. A device according to claim 1, wherein the holding device consists of a base body with guide grooves and holders for installing the fibers in the device.

3. A device according to claim 2, wherein inside-positioned of said guide grooves accommodate the fibers completely.

4. A device according to claim 2, wherein outside-positioned of said guide grooves are V-shaped and thus ensure the alignment of the fiber in a predetermined direction.

5. A device according to claim 1, wherein the stamping device is guided linear within a U-shaped die sink in the holding device.

6. A device according to claim 5, further comprising a guide pin that is attached to the stamp head and extends inside a bore extending through the holding device, whereby a twisting of the stamping device relating to the holding device is prevented.

7. A device according to claim 5, further comprising a spring fitted over the stamp neck between the base body and the stamp head, with said spring normally holding the stamping device in a retracted position within said holding device, and with the retracted position preset by a detent.

8. A device according to claim 1, wherein at least one separating foil is pulled over the underside of the rubber plate to prevent the fiber from adhering.

9. A device according to claim 1, wherein the underside of the stamp is designed to be level or wherein an indentation is provided in the central region, between the stamp and the rubber plate.

10. A method for applying light conductive fibers to a substrate, wherein the holding device with stamping device is fitted onto the mounting yoke, in a position where the stamp underside is pointing upward;

the cleaned fiber is inserted into the device, is aligned and is secured;

adhesive is applied to the fiber and the substrate over the predetermined gluing length;

the holding device with stamping device and secured fiber is removed from the mounting yoke;

the fiber is applied to the substrate surface by applying pressure to the stamp head and remains in this position until the adhesive has hardened.

11. A method according to claim 10, wherein an additional separating foil is loosely fitted on between fiber and separating foil and prior to exerting the pressure.

12. A device for applying a light conductive fiber onto a substrate comprising a holding device for holding and supporting a light conductive fiber between two spaced points, to permit an unsupported portion of the fiber between the spaced points;

and a stamping device mounted within said holding device between said two spaced points for linear movement relative to said holding device and toward a plane in which a held unsupported portion of the optical fibers would be located.

13. A device for applying a light conductive fiber according to claim 12, further comprising a mounting yoke having one end which is connectable to a support surface and an opposite end in which the holding device is mounted with the stamp facing away from the said end.

14. A device for applying a light conductive fiber according to claim 12, wherein the holding device comprises a generally U-shaped basic body having a respective outwardly laterally extending inclined extension adjacent an end surface of each of two opposed legs of the basic body so that said end surfaces form a support surface for the holding device on a substrate on which the fiber is to be applied;

a guide groove for an optical fiber is disposed in each end surface of said legs of said basic body, with said guide grooves being sufficiently large to completely accommodate the fiber;

a respective further guide groove formed in a surface of each of said extensions; and a holder for the fiber located on the respective said surface of each of said extensions.

15. A device for applying a light conductive fiber according to claim 14, wherein said further grooves are V-shaped.

16. A device for applying a light conductive fiber according to claim 14, wherein said stamping device comprises a stamp disposed between said legs of said basic body and a stamp neck fastened to one surface of said stamp and extending through an opening in a base portion of said basic body.

17. A device for applying a light conductive fiber according to claim 16, further comprising a rubber sheet fastened on a surface of said stamp opposite said one surface, for contacting a fiber held by the holding device for application to a substrate upon movement of the stamp.

18. A device for applying a light conductive fiber according to claim 17, further comprising at least one separating foil covering said rubber sheet to prevent adherence of a fiber to the rubber sheet.

19. A device for applying a light conductive fiber according to claim 14, wherein said one surface of the stamp is provided with an indentation in a central region for accomodation of a functional unit connected to the optical fiber to be applied.

* * * * *